United States Patent [19]

Young

[11] 4,402,852
[45] Sep. 6, 1983

[54] NONCORROSIVE UREA-SULFURIC ACID COMPOSITIONS

[75] Inventor: Donald C. Young, Fullerton, Calif.

[73] Assignee: Union Oil Company of California, Los Angeles, Calif.

[21] Appl. No.: 331,001

[22] Filed: Dec. 15, 1981

[51] Int. Cl.³ .................. C05C 9/00; C23F 11/16; C23F 11/18

[52] U.S. Cl. ..................... 252/182; 71/28; 71/99; 71/DIG. 4; 106/14.15; 106/14.21; 106/14.33; 252/387; 252/389 R; 422/12; 422/16; 564/3; 564/17; 564/68

[58] Field of Search ............ 252/182, 387, 389 R; 71/28, 99, DIG. 4; 106/14.15, 14.21, 14.33; 422/12, 16; 564/3, 17, 68

[56] References Cited

U.S. PATENT DOCUMENTS

| | | | |
|---|---|---|---|
| 3,313,613 | 4/1967 | Green | 71/28 |
| 3,879,305 | 4/1975 | Ehrlich | 252/402 |
| 4,028,088 | 6/1977 | Young et al. | 71/28 |
| 4,071,470 | 1/1978 | Davidson et al. | 252/389 R |
| 4,116,664 | 9/1978 | Jones | 71/29 |
| 4,143,119 | 3/1979 | Asperger et al. | 252/389 R |
| 4,214,888 | 7/1980 | Young | 71/DIG. 4 |

OTHER PUBLICATIONS

I. N. Putilova, et al., "Metallic Corrosion Inhibitors", Pergamon Press, 1960, pp. 76–80.
Herbert H. Uhlig, PH.D., "The Corrosion Handbook", sponsored by the Electrochemical Society, Inc., John Wiley and Sons, Inc., 1948, pp. 910–912.
L. L. Shreir, "Corrosion", vols. 1 and 2, pp. 3.55-3.58, 18.9–18.11, 18.16–18.19, 18.41–18.43, John Wiley and Sons, Inc., 1963.
D. F. du Toit, Verslag Akad. Wetenschappen, 22, 573–574 (abstracted in Chemical Abstracts, 8, 2346, 1914).
L. H. Dalman, "Ternary Systems of Urea and Acids. I. Urea, Nitric Acid and Water. II. Urea, Sulfuric Acid and Water. III. Urea, Oxalic Acid and Water."; JACS, 56, 549–553 (1934).
Sulfur Institute Bulletin No. 10 (1964), "Adding Plant Nutrient Sulfur to Fertilizer".

Primary Examiner—Irwin Gluck
Attorney, Agent, or Firm—Dean Sandford; Gregory F. Wirzbicki; Michael H. Laird

[57] ABSTRACT

Improved, liquid, urea-sulfuric acid reaction product compositions, noncorrosive to carbon steel, contain about 5 to about 75 weight percent urea, about 5 to about 85 weight percent sulfuric acid, 0 to about 75 weight percent water, and a corrosion inhibiting amount of certain dialkylthioureas, in which the urea and sulfuric acid together constitute at least about 25 weight percent of the composition, the urea/sulfuric acid molar ratio of the composition is greater than 2 or less than 1, and a portion of the urea and sulfuric acid are present as monourea sulfate, diurea sulfate, or combinations thereof. The compositions can also contain corrosion inhibiting amounts of one or more cupric ion-containing compounds sufficient to reduce the corrosivity of the composition to stainless steel.

6 Claims, 7 Drawing Figures

NONCORROSIVE UREA-SULFURIC ACID COMPOSITIONS

BACKGROUND OF THE INVENTION

1. Field of the Invention

This invention relates to the field of liquid urea-sulfuric acid compositions, and particularly to such compositions having reduced corrosivity to carbon steel. The compositions are stable homogeneous solutions of urea-sulfuric acid reaction products of significantly reduced corrosivity toward carbon steels even at elevated temperatures and under flow conditions. Thus, they enable the use of such urea-sulfuric acid reaction products at elevated temperatures and/or under flow conditions during their manufacture, transport or use in carbon steel equipment.

2. Description of the Prior Art

Both urea and sulfuric acid are widely used for a variety of purposes in numerous industries as fertilizers, soil adjuvants, chemical treating agents, chemical precursors and reactants.

Previous investigators have observed that urea, sulfuric acid, and optionally water, can be reacted to form concentrated solutions of urea and sulfuric acid reaction products in which at least a portion of the urea is present as mono and/or diurea sulfate. However, they did not recognize that reaction products of different urea/sulfuric acid ratio exhibit markedly different corrosivity towards carbon steel, that the reaction products differ markedly from sulfuric acid with respect to their corrosivity and to their response to known sulfuric acid corrosion inhibitors, or that the corrosivity of all of the reaction products toward stainless steel could be markedly reduced by the addition of corrosion inhibiting amounts of cupric ion-containing compounds.

D. F. du Toit found that urea formed certain compounds with oxalic, acetic, hydrochloric, nitric and sulfuric acids, and that the resulting compounds were stable in contact with their solutions at 20° C. Verslag Akad. Wetenschappen, 22, 573-4 (abstracted in Chemical Abstracts, 8, 2346, 1914).

L. H. Dalman expanded on du Toit's work by developing the phase relationships between the solid phase and saturated solutions at 10° C. and 25° C. "Ternary Systems of Urea and Acids. I. Urea, Nitric Acid and Water. II. Urea, Sulfuric Acid and Water. III. Urea, Oxalic Acid and Water"; JACS, 56, 549-53 (1934).

In the article "Adding Plant Nutrient Sulfur to Fertilizer," Sulfur Institute Bulletin No. 10 (1964), the Sulfur Institute discussed the addition of nutrient sulfur to fertilizers and mentioned that urea reacts with sulfuric acid to form two complexes of urea sulfate which are useful fertilizers.

Jones, U.S. Pat. No. 4,116,664 discloses what is referred to therein as a tortuous, multistage process of producing combinations of urea and sulfuric acid in which portions of the sulfuric acid are incrementally added to and reacted with the total amount of urea to be reacted in each of several stages until the total amount of sulfuric acid has been reacted with the urea. The resulting product is unstable and requires further processing. Jones preferably adds water later as required to obtain stability and the desired composition. He discloses that the reaction can be carried out at temperatures of 100° to 200° F. and that if the sulfuric acid is added to the total amount of urea at a rate which is too fast the temperature goes to about 200° to 225° F. and that a gas is emitted that causes changes in product characteristics such as solidification. The patent states that temperatures of 160° to 200° F. are preferred and that the products can be used as fertilizers.

A variety of compounds, including dialkylthioureas, such as diethylthiourea and dibutylthiourea, are known to reduce the corrosivity of sulfuric acid to carbon steels. Also, it is known that a wide variety of compounds, including cupric sulfate, reduce sulfuric acid corrosivity toward stainless steels.

Although these investigators disclosed several characteristics of urea-sulfuric acid combinations and methods of making those combinations, and that the products were useful soil adjuvants and/or fertilizers, they did not recognize that the corrosivity of the urea-sulfuric acid reaction products to carbon steel and the relationship of corrosivity to alkylthiourea concentration vary dramatically as a function of urea/sulfuric acid molar ratio, or that the corrosivity of some compositions to carbon steel can be dramatically reduced by the addition of corrosion inhibiting amounts of certain alkyl-substituted thiourea compounds. Nor did they recognize that the corrosivity of these compositions to stainless steel is reduced by cupric ion-containing compounds.

They were also not aware that the corrosion characteristics of the urea-sulfuric acid compositions of this invention differ markedly from those of sulfuric acid. For instance, all of the sulfuric acid inhibitors, with the exception of the alkylthioureas, have little or no beneficial effect on the urea-sulfuric acid compositions, and many significantly increase corrosion rate.

Furthermore, none of the inhibitors, including the thioureas, have any significant beneficial effect on compositions having urea/sulfuric acid molar ratios between 1 and 2. Corrosivity is relatively low within that composition range but is intolerably high with compositions having urea/sulfuric acid molar ratios above 2 or below 1. Thus, corrosivity increases dramatically as sulfuric acid concentration is either increased or decreased relative to urea concentration outside this range of molar ratios. Another anomalous characteristic of these compositions is that some, but not all of them are significantly more corrosive to stainless steel than they are to carbon steel. Thus, 10-0-0-19 corrodes AISI C-1010 carbon steel at a rate of 56 mils per year under static conditions at 150° F. and corrodes AISI type 316 stainless steel at 300 mils per year under identical conditions.

It is therefore one object of this invention to provide improved, liquid urea-sulfuric acid compositions.

It is another object of this invention to provide liquid, urea-sulfuric acid reaction product compositions which are relatively noncorrosive to carbon steel even at elevated temperatures or under fluid flow conditions.

It is another object of this invention to provide liquid, urea-sulfuric acid reaction product compositions of reduced corrosivity to both carbon steel and stainless steel.

Other objects, aspects and advantages of this invention will be apparent to one skilled in the art in view of the following disclosure, the drawings, and the appended claims.

SUMMARY OF THE INVENTION

This invention relates to liquid urea-sulfuric acid compositions which are relatively noncorrosive to carbon steel under either quiescent or fluid flow conditions, even at elevated temperatures. These compositions contain corrosion inhibiting amounts of one or more alkyl-substituted thiourea compounds and can be used in carbon steel equipment with considerably less corrosion than would result from the use of similar compositions in the absence of the thiourea compounds. The invention also relates to urea-sulfuric acid compositions containing both the specified thiourea compounds and cupric ion-containing compounds which are relatively noncorrosive to both carbon steel and stainless steel.

In accordance with one embodiment of this invention, homogeneous, liquid urea-sulfuric compositions relatively noncorrosive to carbon steel comprise urea-sulfuric acid reaction products in which the urea/sulfuric acid molar ratio is greater than 2 or less than 1 containing corrosion inhibiting amounts of certain dialkyl-thioureas. A portion of the urea and sulfuric acid are present as monourea sulfate or diurea sulfate.

In accordance with another embodiment of this invention, compositions which are relatively noncorrosive to both carbon steel and stainless steel comprise corrosion inhibiting amounts of cupric ion-containing compounds in addition to the thiourea compounds.

BRIEF DESCRIPTION OF THE DRAWINGS

The invention will be more readily understood by reference to the drawings of which.

DETAILED DESCRIPTION OF THE INVENTION

The compositions of this invention comprise liquid urea-sulfuric acid reaction products containing 5 to about 85, preferably about 10 to about 80 weight percent sulfuric acid; about 5 to about 75, preferably about 10 to about 70 weight percent urea; and 0 to about 75, usually 0 to about 50, and preferably 0 to about 25 weight percent water. Urea and sulfuric acid, in combination, constitute at least about 25, usually at least about 50, and preferably at least about 75 weight percent of the composition, and are present in relative proportions corresponding to urea/sulfuric acid molar ratios of more than 2 or less than 1. A portion of the urea and sulfuric acid are present as mono- or diurea sulfates.

The more concentrated compositions, i.e., those containing less than 50, preferably less than 25 weight percent water, are particularly preferred due to their lower relative corrosivity and to the advantages of handling smaller volumes and weights of material.

It has been discovered that compositions having urea/sulfuric acid molar ratios within the range of 1 to 2 are much lless corrosive to mild steel than are compositions having urea/sulfuric acid molar ratios outside that range. Compositions having molar ratios within that range are also much less responsive to the corrosion inhibiting effect of the alkyl-substituted thiourea compounds. These characteristics are discussed in more detail hereinafter.

The four-digit composition designations used herein, e.g., 18-0-0-17, are conventionally used in the agricultural industry to designate the concentration of nitrogen, phosphorus (as $P_2O_5$), potassium (as $K_2O$), and a fourth component—in this case sulfur expressed as the element. Thus, the composition 18-0-0-17 contains 18 weight percent nitrogen derived from urea and 17 weight percent sulfur derived from sulfuric acid. Using the atomic weights for nitrogen (14) and sulfur (32) and the molecular formulas and molecular weights for urea (60.06) and sulfuric acid (98.08), it can be readily determined that this formulation contains 38.6 weight percent urea and 52.1 weight percent sulfuric acid. By difference, the solution contains 9.3 weight percent water. The concentration of sulfuric acid and urea in all other compositions can be determined by the same procedure.

Figure 1:
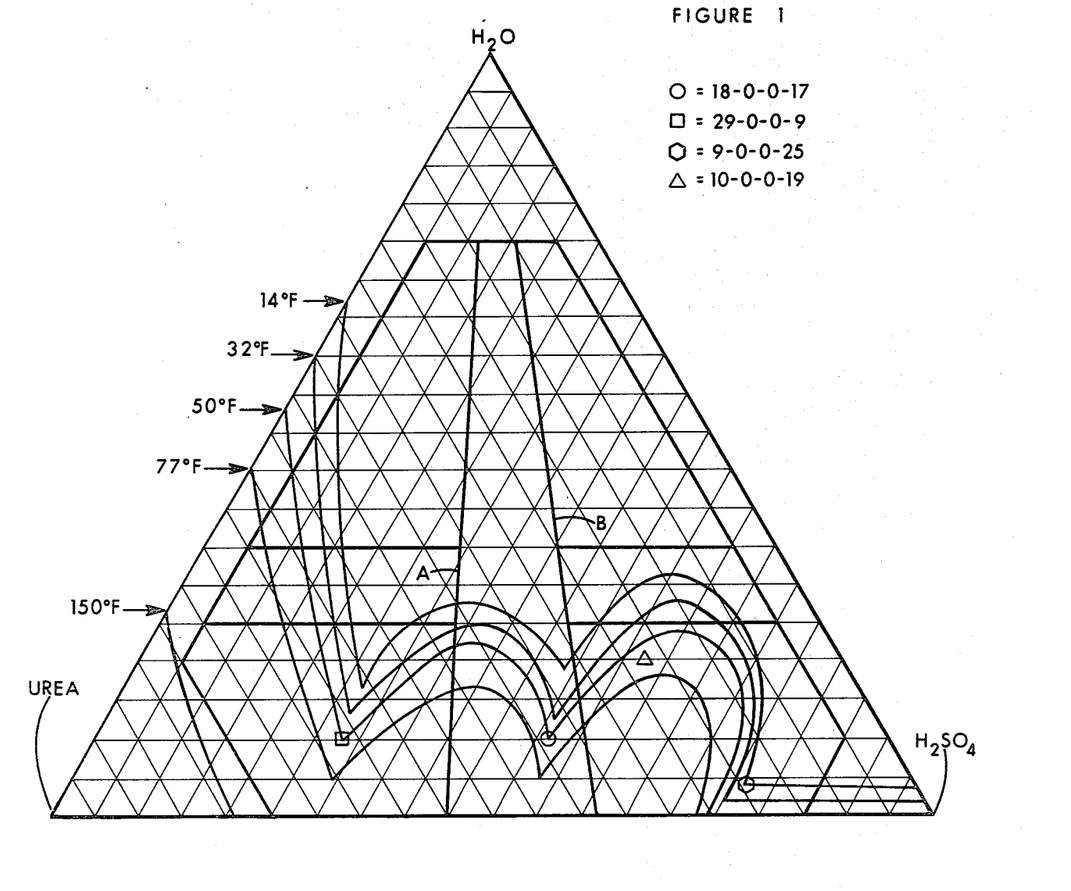
FIG. 1 is a ternary phase diagram for the urea, sulfuric acid, and water system illustrating isotherms at several different temperatures, the existence of three prominent eutectics along those isotherms, and the urea-sulfuric reaction products encompassed by this invention.

The compositions and some of their physical properties are illustrated by the ternary phase diagram of FIG. 1. The phase diagram defines the relative proportions in weight percent for each of the three components—urea, sulfuric acid, and water—at any point within the diagram. At each apex of the triangle the system consists completely of the indicated component. Thus, the urea concentration at the urea apex is 100 percent and diminishes linearly to 0 along a straight line from the urea apex to the midpoint of the $H_2O$-$H_2SO_4$ boundary line, i.e., the side of the triangle opposite the urea apex. The same is true of the remaining two components—water and sulfuric acid.

The diagram also illustrates the isotherms for the system at 14° F., 32° F., 50° F., 77° F., and 150° F. The 150° F. isotherm is illustrated only partially at the lower left-hand portion of the diagram. Each isotherm defines compositions which, if cooled below the temperature indicated for the respective isotherm, will precipitate components of the system. However, the solutions will super-cool dramatically, e.g., by as much as 50° F., or more, under quiescent conditions in the absence of seed crystals, impurities, etc., that promote crystallization.

As indicated by the pattern of the isotherms, systems having a fixed ratio of urea to sulfuric acid become more stable at lower temperatures as the water concentration is increased. This is true throughout most of the phase diagram with the exception of the region in the vicinity of the higher acid eutectic in the lower right-hand portion of the phase diagram.

Three prominent eutectics are apparent within the region of the illustrated isotherms. Each eutectic represents a discontinuity in the response of the system, e.g., of crystallization point, to changes in solute concentration, and indicates the points of maximum solute concentration for a given isotherm in the regions of the phase diagram associated with those eutectics.

As indicated in the legend on FIG. 1, the left-hand eutectic on the 50° F. isotherm corresponds to the formulation 29-0-0-9. The middle eutectic on the same isotherm corresponds to the composition 18-0-0-17. The right-hand eutectic on the 14° F. isotherm corresponds to 9-0-0-25, and the formulation intermediate the 50° F. and the 77° F. isotherms between the middle and right-hand eutectics indicated by a triangular designation corresponds to 10-0-0-19.

The bold lines within the diagram generally define the boundaries of the preferred reaction products of this invention. Bold lines parallel to one side of the phase diagram define a fixed concentration of the component designated at the apex of the triangle opposite the side to which that line is parallel. Thus, the higher horizontal line in FIG. 1 borders the area of formulations containing 75 weight percent water or less, and varying amounts of urea and sulfuric acid. The area below the horizontal line across the center of the diagram defines formulations containing 50 weight percent water or less.

Line A extending upwardly in the central part of the diagram defines compositions having urea/sulfuric acid molar ratios of 2 and, if extended upwardly, would intersect the water apex. All compositions falling to the left of Line A have urea/sulfuric acid ratios greater than 2. Line B, also in the central portion of the diagram, defines compositions having urea/sulfuric acid molar ratios of 1 and, if extended upwardly, would also intersect the water apex. All compositions to the right of Line B have urea/sulfuric acid molar ratios less than 1.

It has been discovered that compositions having urea/sulfuric acid molar ratios greater than 2 or less than 1 are substantially more corrosive to carbon steel than are compositions having molar ratios within the range of 1 to 2. Furthermore, the corrosivity of compositions having urea/sulfuric acid molar ratios within the range of 1 to 2 is influenced only to a very minor extent by the corrosion inhibitors employed in the compositions of this invention under all conditions investigated. Also, compositional and inhibitor effects on carbon steel corrosion differ markedly from the effects of the same variables on stainless steel corrosion. The reasons for these anomalies have not been defined with certainty.

Figure 2:
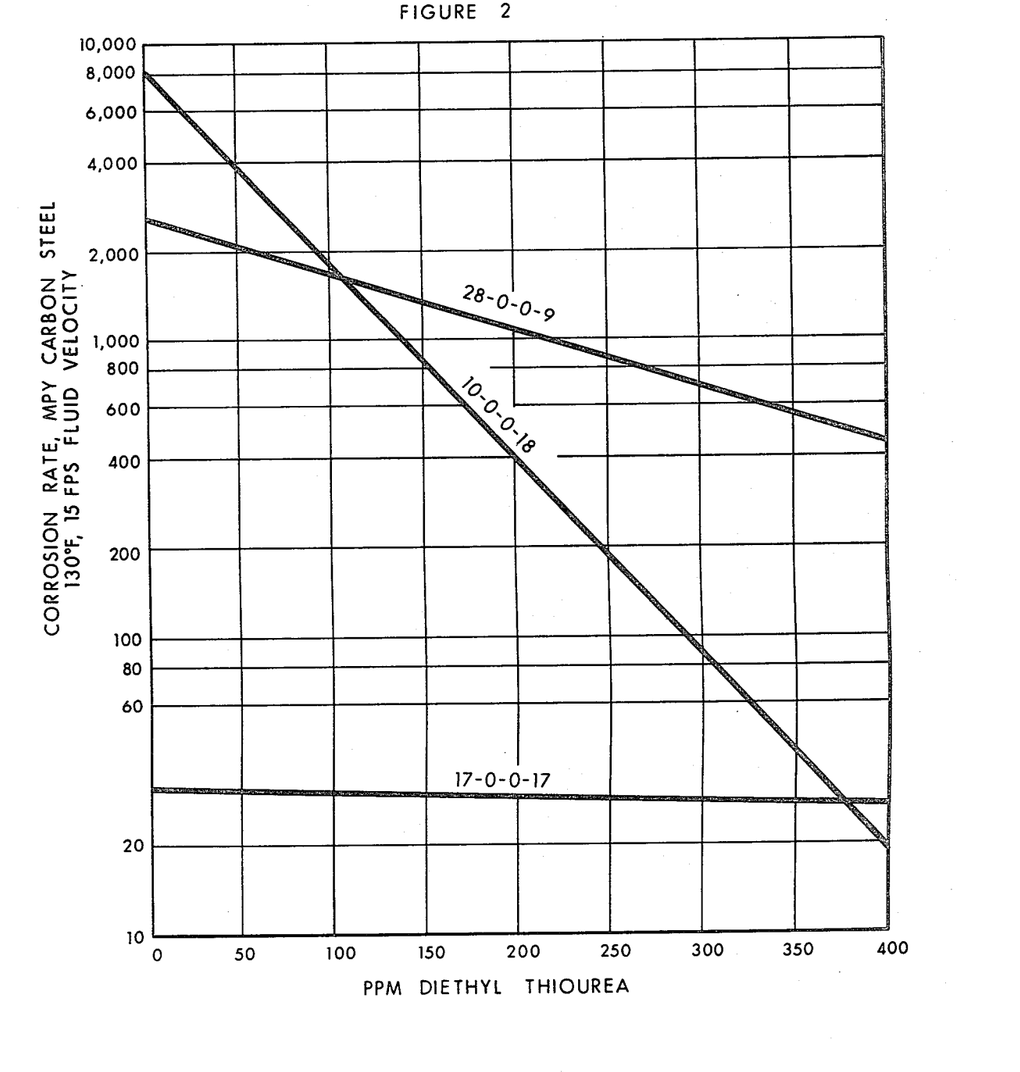
FIG. 2 is a correlation of corrosion rate of carbon steel (AISI C-1010) by the three designated products at 15 feet per second fluid velocity and 130° F. versus diethylthiourea concentration.
Figure 3:
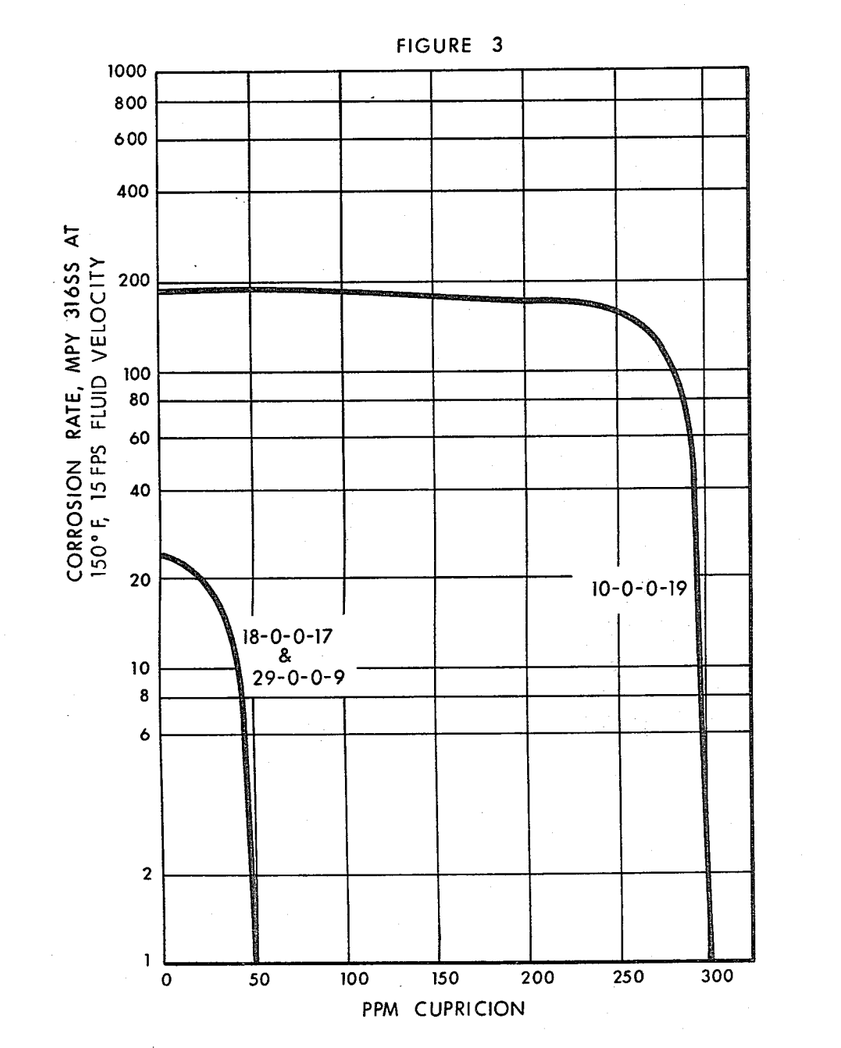
FIG. 3 is a correlation of the corrosion rate of stainless steel (AISI Type 316) by the three designated products at 15 feet per second fluid velocity and 150° F. versus cupric ion concentration.

These factors are illustrated, in part, in FIGS. 2 and 3. FIG. 2 is a correlation of carbon steel (AISI C-1010) corrosion rate at 130° F. and 15 feet per second fluid viscosity, versus diethylthiourea concentration in parts per million.

As illustrated in FIG. 2, 10-0-0-18, having a urea/sulfuric acid molar ratio of 0.633, corroded carbon steel at a rate in excess of 8000 mils per year. However, the corrosivity of that formulation decreased dramatically as diethylthiourea (DETU) concentration was increased, and was reduced to a level of approximately 18 mils per year at a DETU concentration of 400 ppm. The corrosivity of 10-0-0-18 would be even lower at higher DETU concentrations.

Although the 28-0-0-9 composition had a lower corrosivity in the absence of DETU than did 10-0-0-18, its corrosion rate of 2600 mils per per was still excessive. Nevertheless, the corrosivity of 28-0-0-9 (urea/sulfuric acid molar ratio of 3.57) was reduced to approximately 450 mils per year at 400 ppm DETU. The corrosivity of this formulation could be reduced to acceptable levels (at the defined temperature and flow rate) with higher DETU concentrations.

In contrast, to 10-0-0-18 and 28-0-0-9, the corrosivity of the 17-0-0-17 composition (urea/sulfuric acid molar ratio of 1.143), was only 31 mils per year at 130° F. and 15 feet per second fluid velocity in the absence of diethylthiourea. This corrosion rate is acceptable in many situations involving temporary or intermittent exposure. Furthermore, the corrosivity of 17-0-0-17 was reduced only nominally to a level of approximately 28 mils per year at a diethylthiourea concentration of 400 ppm. At that point, the corrosivity of 17-0-0-17 actually exceeded that of 10-0-0-18.

These distinctions in corrosion rate and corrosion inhibitor response persist under all conditions of temperature and flow rate and over a wide range of dilution. The corrosivity of all formulations increases with temperature, flow rate and dilution with water in the presence or absence of the thiourea inhibitors. For instance, the corrosion rate for 10-0-0-18 at 80° F. without dilution under static conditions in the absence of corrosion inhibitor was only 16 mils per year compared to 1483 mils per year with 40 percent dilution. Similarly, increasing fluid velocity from zero to 15 feet per second increased corrosion rate from 16 MPY to 4489 MPY in the absence of inhibitor at zero dilution. Similar relative effects were observed with 17-0-0-17 and 28-0-0-9.

Figure 4:
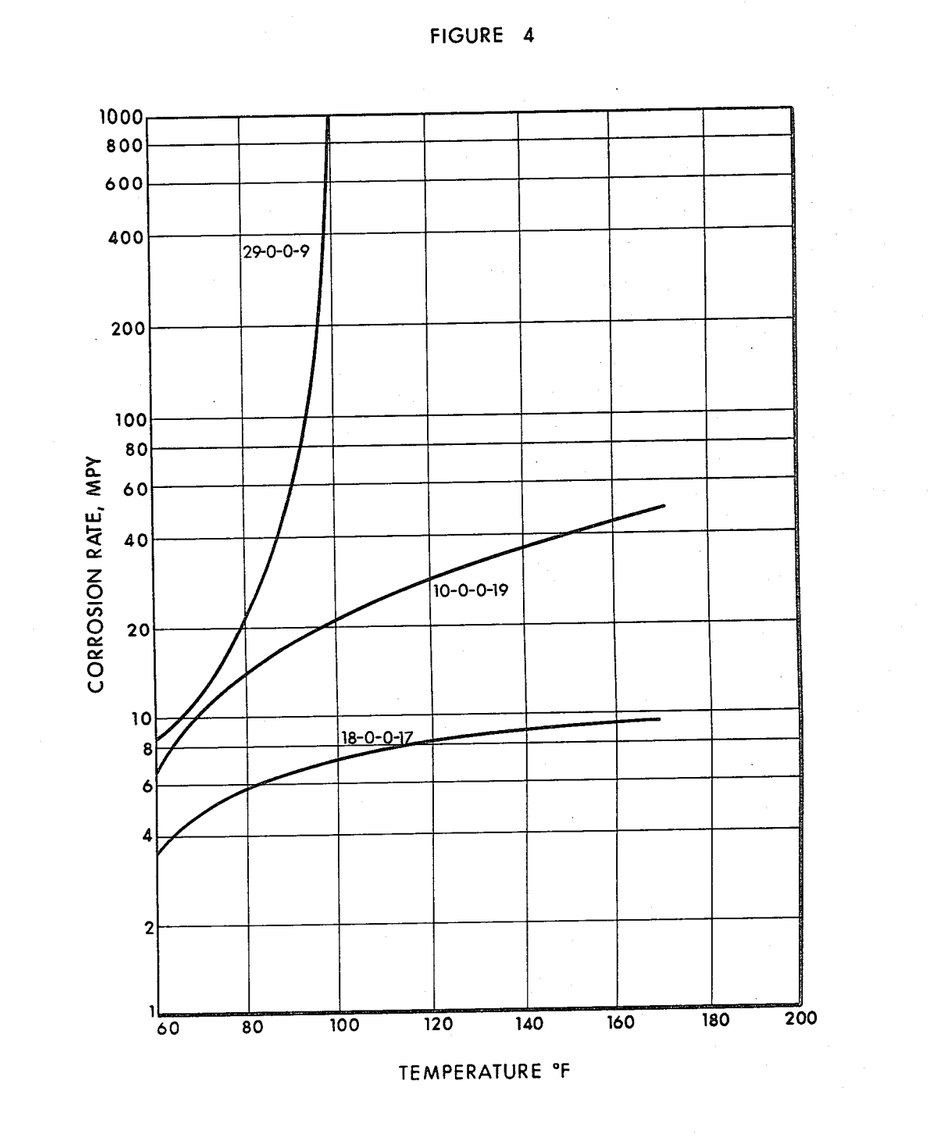
FIG. 4 is a correlation of the static, carbon steel corrosion rate with temperature for the three designated compositions.

The effect of temperature on carbon steel corrosion rate for three compositions is illustrated in FIG. 4 which shows that the corrosivity of 29-0-0-9 (which is approximately equivalent to that of 28-0-0-9) increases dramatically as temperature is increased from 60° to 100° F., and to a much greater extent than is the corrosivity of either 10-0-0-19 or 18-0-0-17. The illustrated differences in the temperature effect on corrosivity for formulations of different urea/sulfuric acid molar ratio persist at different fluid velocities, at different degrees of dilution, and in the presence of corrosion inhibitors.

In marked contrast to the dissimilar corrosivity of 17-0-0-17 and 28-0-0-9 on carbon steel, the close analogs of those compositions—18-0-0-17 and 29-0-0-9—exhibit remarkably similarly corrosivity toward stainless steel at 150° F. and 15 feet per second fluid velocity, as illustrated in FIG. 2. They also exhibit remarkably similar response to inhibitor concentration. For instance, the corrosivity of 18-0-0-17 to AISI 316 stainless steel decreases to approximately zero at 50 ppm curpic ion concentration. By comparison, the corrosivity of 17-0-0-17 to carbon steel was relatively uneffected by diethylthiourea as illustrated in FIG. 2.

The compositions of this invention contain corrosion inhibiting amounts of alkyl-substituted thiourea compounds sufficient to reduce the corrosivity to carbon steel to the desired levels. Effective corrosion inhibitors include dialkylthioureas in which each alkyl group has from 1 to about 4 carbon atoms. Combinations of these compounds can be used. Exemplary are dimethylthiourea; dipropylthiourea; dibutylthiourea; methyl,-propylthiourea; ethyl,propylthiourea; and the like. When these compounds are used in combination with cupric ion-containing compounds as discussed hereinafter, their alkyl substituents preferably contain three carbon atoms or less. Curpic ion markedly reduces the inhibiting effect of butyl-substituted thioureas for reasons that are not fully understood. Yet it has llittle, if any, detrimental effect on the lower alkylthioureas.

The thiourea compounds are usually employed at concentrations of at least about 25 ppm, generally at least about 50 ppm, and up to 1000 ppm or more. Different inhibitor concentrations are required to achieve comparable corrosivity with different compositions or under different conditions of temperature, flow rate or degree of dilution. Optimum inhibitor concentration will also vary from one composition to the next due to the dramatic differences in corrosivity and inhibitor effect between different compositions as illustrated in FIG. 2.

These compositions can also contain corrosion inhibiting amounts of cupric ion-containing compounds in concentrations sufficient to reduce their corrosivity to stainless steel. The cupric ion-containing compounds, when employed, are usually added in amounts corresponding to cupric ion concentrations of at least 25 ppm, generally at least about 50 ppm, and up to 400 ppm or more, depending upon operating conditions. Here again, different cupric ion concentrations are required for different compositions and different operating conditions to provide the desired degree of protection for stainless steels due to the factors discussed above. However, as disclosed in my copending application, Ser. No. 330,904, filed Dec. 15, 1981, the cupric ion-containing compounds are also effective for reducing the corrosivity of compositions having urea/sulfuric acid molar ratios within the range of 1 to 2, such as 17-0-0-17 and 18-0-0-17. Higher cupric ion concentrations will be required at higher temperatures, flow rates and dilution ratios. The corrosivity of these compositions toward stainless steel also varies as a function of sulfuric acid/urea weight ratio. For instance, compositions having sulfuric acid/urea weight ratios below about 1.5 should contain at least about 25 ppm cupric ion, while compositions having sulfuric acid/urea weight ratios greater than about 1.5 should have cupric ion concentrations of at least about 250 ppm as discussed in copending Ser. No. 330,904 filed Dec. 15, 1981.

The inihibitor concentration required to obtain a certain level of carbon steel corrosivity with a given composition at a particular temperature and flow velocity can be readily determined by exposing standard samples of the carbon steel to different samples of the given composition containing various inhibitor concentrations at the temperatures and flow velocity involved. The results of this test will provide a correlation similar to that illustrated in FIG. 2. The cupric ion concentration required to obtain the desired reduction in corrosivity to the stainless steel can be determined by the same procedure using samples of the type of stainless steel to which the composition will be exposed.

The effectiveness of the cupric ion-containing compounds is dependent only upon the presence of sufficient cupric ion in the composition, regardless of the form in which it is added. Thus, any organic or inorganic copper-containing compounds can be employed which, when added to the composition, either cause the formation of or introduce cupric ion into the composition. However, inorganic compounds such as cupric oxide, sulfate, nitrage, halides, and the like, are presently preferred due to their availability and relatively low cost. Cupric sulfate is particularly preferred in many formulations since the sulfate anion does not introduce additional ions into the composition. Organic or inorganic compounds other than the sulfates may be converted to the sulfate in solution, particularly in compositions containing higher proportions of sulfuric acid. Nevertheless, such compositions can be effectively used since they effectively introduce cupric ion into the composition.

Surprisingly, the thiourea compounds do not significantly reduce the corrosivity of these compositions to stainless steels, and cupric ion-containing compounds do not reduce corrosivity to carbon steels. Furthermore, numerous compounds other than the thiourea and cupric ion-containing compounds, known to reduce the corrosivity of sulfuric acid to stainless steels and carbon steels, do not significantly reduce the corrosivity of these compositions to either substrate. Some sulfuric acid inhibitors actually increase the corrosivity of these compositions to carbon steel and/or stainless steel as illustrated in the examples.

Carbon steel, as that term is used herein, includes alloys of iron and 0.02 to about 1.5 weight percent carbon, and less than 4, usually less than 2 weight percent of alloying elements such as cobalt, nickel, molybdenum, boron, manganese, copper, tungsten, cobalt, silicon and the rare earth elements. Carbon steels are conventionally produced from pig iron by oxidizing out the excess carbon and other impurities such as phosphorus, sulfur, and silicon with an oxygen-rich gas and iron ore in any one of several processes such as the open hearth, Bessemer, basic oxygen, or electric furnace processes.

Stainless steels are generally classified as carbon steels containing at least about 5 weight percent, usually about 5 to about 40 weight percent, and normally about 10 to about 25 weight percent chromium. They may also contain other alloying elements such as nickel, cerium, aluminum, titanium, copper, or other elements.

Stainless steels are usually classified in three different categories—austenitic, ferritic, and martensitic steels—which have in common the fact that they contain significant amounts of chromium and resist corrosion and oxidation to a greater extent than do ordinary carbon steels and most alloy steels. Austenitic stainless steels are the most common alloys of this group and are characterized, in part, by mininmum chromium contents of about 16 percent and minimum nickel contents of about 7 percent. AISI types 302, 303, 304, and 316 are several of the more extensively used austenitic stainless steels.

Ferritic stainless steels are generally characterized, in part, by the fact that they contain chromium only (in addition to the other components of carbon steel) or only very minor amounts of alloying elements. Martensitic stainless steels are also characterized by the fact that they contain only chromium as the primary alloying element and minor, if any, amounts of other alloys, and by their characteristic of being hardneable by heat treatment.

The urea-sulfuric acid compositions of this invention can be produced by the reaction of urea and sulfuric acid and, optionally water, by either batch or continuous process. The more concentrated solutions, i.e., those containing less than 25 weight percent water, are particularly preferred, and they are preferably produced by the reaction of solid urea and concentrated sulfuric acid by the methods described in my copending application Ser. No. 318,629 filed Nov. 5, 1981 which is incorporated herein by reference.

Those processes can be used to accurately and consistently produce urea-sulfuric acid reaction products of predetermined composition and crystallization temperature essentially or completely free of decomposition products such as sulfamic and/or ammonium sulfamate. Generally, the reaction products can be produced by separately and simultaneously feeding urea, sulfuric acid, and optionally water, as required by stoichiometry, into a reacting liquid phase contained in a reaction zone, in proportions corresponding to the relative proportion of each respective component in a predetermined product composition within the ranges discussed above. The urea and sulfuric acid react within the reaction zone under controlled conditions in which reaction temperature is maintained at a point below about 176° F., and below the incipient decomposition temperature of the predetermined product.

Even minor decomposition of the reactants and/or product during manufacture, or otherwise, results in the formation of known toxic materials including ammonium sulfamate and sulfamic acid. Thus, adequate temperature control is imperative to prevent decomposition which, once commenced in a large volume of inadequately cooled material, can lead to very rapid temperature escalation, e.g., up to 600° F. and higher, and to the literal explosion of the reactor and associated processing facilities.

The magnitude of the reaction exotherm and incipient decomposition temperature variations are illustrated in the following table:

| Composition | Incipient Decomposition Temperature | Heat of Reaction BTUs per Ton |
|---|---|---|
| 29-0-0-9 | 158° F. | 73,600 |
| 9-0-0-25 | 176° F. | 149,500 |
| 10-0-0-19 | 176° F. | 195,500 |

The heats of reaction reported in the foregoing table were determined calorimerically using the reaction of prilled urea with 98 percent sulfuric acid and the amount of water required for the designated formulation.

Incipient decomposition temperatures can be determined by very gradually increasing the temperature of a solution of the designated composition until gas evolution is first observed. The incipience decomposition temperature of any formulation can be determined by this procedure.

The evolved gas is carbon dioxide and, in the absence of unreacted sulfuric acid, may also comprise ammonia. In the presence of unreacted sulfuric acid, a condition that exists in the reaction zone, the ammonia would react very exothermically with sulfuric acid to increase solution temperature and heat load at a rate even faster than that occasioned by the sulfuric acid-urea reaction. This mechanism may be partially responsible for the observed autocatalytic decomposition of the more concentrated compositions at elevated temperatures.

As a general rule, incipient decomposition temperatures ragne from about 155° F. to about 176° F. with the higher decomposition temperatures being associated with products having higher acid-to-urea ratios.

Gross system temperature is not an adequate indication of incipient decomposition at localized points within a relatively large volume of solution, e.g., in a commercial reactor. For instance, the direct addition of concentrated sulfuric acid to a large volume of urea as described in U.S. Pat. No. 4,116,664 referred to above, will invariably result in localized overheating and temperatures in excess of incipient decomposition temperatures even though the average temperature for the bulk of urea may be somewhat lower. This was confirmed by the fact that samples of materials produced in the process described in that patent were found to contain as much as 5 to 6 weight percent of the decomposition products ammonium sulfamate and/or sulfamic acid.

Continuous processing is preferred, particularly in the manufacture of the more concentrated solutions, since it improves process stability and the control of composition, reaction temperature, crystallization point and corrosivity. All of these factors are important for different reasons.

Accurate control of reaction phase composition is closely related to temperature control due to the highly exothermic nature of the sulfuric acid-urea reaction. It is also closely related to crystallization point and corrosivity; minor variations in product composition can significantly affect both properties. Significant variation in crystallization point can result in solids formation or complete "setting up" of the product in lower temperature treating, storage or application facilities. Increased corrosivity occasioned by composition changes can dramatically increase the corrosion of the reactor and processing facilities, particularly at elevated processing temperatures, unless sufficient inhibitor is present in the system.

These several characteristics can be controlled by gradually and simultaneously adding urea, concentrated sulfuric acid and water to the reaction zone at relative rates corresponding to the concentration of each component in a predetermined product and cooling the resultant reacting liquid phase sufficiently to maintain it at a temperature below its incipient decomposition temperature and below 176° F., at all times. As pointed out above, bulk system temperature will not accurately indicate the presence of absence of localized overheating unless the reacting liquid phase is adequately agitated and thoroughly mixed during the course of the reaction.

Although the reaction will proceed at relatively low temperatures, it becomes too slow to be economically desirable at temperatures much below 120° F. Accordingly, the reaction is usually run at temperatures of at least 120° F., preferably at least about 130° F., and below 176° F., preferably below about 160° F., and most preferably about 150° F. or less. The lower temperatures, e.g., of about 150° F.–160° F., or less, are particularly preferred.

The feed rates of all three components, and the composition of the reacting liquid phase, should be maintained as closely as possible to the stoichiometric proportions of each respective component in the predetermined product. Thus, the concentration of each component should be maintained within about 2 percent, preferably within 1 percent or less, of its stoichiometric value in the product. In the preferred method in which a portion of the reaction phase is removed from the reaction zone and cooled by direct air contact heat exchange, some water is lost from the system and must be made up by increasing the water feed to the reaction zone by an amount proportional to the rate of water loss in the cooler. These close tolerances on reactant composition and temperature will generally allow control of product crystallization temperature within 10° F., preferably within 5° F. or less, of the desired crystallization temperature.

Although the considerable heat of reaction theoretically can be dissipated by essentially any cooling means, such as cooling coils within the reactor, heat dissipation and temperature control are facilitated by assuring that the reaction zone into which the urea-sulfuric acid and water are introduced, contains an amount of a mixture of reactants and reaction product corresponding to at least about 0.1, and preferably at least about 0.2 times the hourly feed rate. Larger inventories of at least about 0.5, usually at least about 1, and often at least about 2 times the hourly feed rate are preferred in the continuous process. Although somewhat lower reactor volumes are adequate to control temperature in the continuous process in some cases, they are not adequate to assure complete reaction of the customary forms of urea feeds, i.e., prills and/or granules. Longer holding times, and thus larger reactor inventories relative to product withdrawal rate and reactant feed rate, are preferred in the continuous process to assure that the withdrawn product does not contain unreacted urea.

The minimum reactor volume required to prevent the discharge of unreacted urea during continuous operation can be defined by the following expression which is unique to this reactor system:

$$V_o = \frac{u}{k}(14.3\, d^2 - 1)$$

where k is the first order rate constant in reciprocal minutes, d s the diameter of the largest urea particles in millimeters, $v_o$ is the volume of the liquid phase within the reaction zone in gallons, and u is the production rate from the reaction zne in gallons per minute. From this relationship, it can be seen that theoretically very small reactor volumes could be used with very small diameter urea feeds, e.g., urea dust. As a practical matter, however, minimum volumes of about one-half the hourly production rate are required to provide sufficient inventory for adequate cooling to prevent incipient decomposition and for more effective process control.

The first order rate constant can be determined from the expression unique to this system:

$$k = \frac{1}{t}(\ln d^2 + 2.659)$$

where t is the time in minutes required for dissolution of the type of urea feed, e.g., prills, pellets, granules, etc.

The dissolution rate varies with urea type, e.g., prilled urea or granular urea. Prilled urea is usually less dense and somewhat more porous than is granular urea, and is produced by forming droplets of molten urea in a prilling tower of sufficient height to allow the urea droplets to solidify during their descent. Granular ureas are usually produced by spraying molten urea onto urea "seeds" or dust in granulating apparatus such as pan or drum granulators.

The reaction rate constant can be determined experimentally for any given product composition and urea feed type by determining the rate at which the urea particle dissolves in the given formulation.

The reaction rate is first order and varies markedly with temperature. Experimentally observed values for the rate constants for 29-0-0-9 and 10-0-0-19, and the effect of temperature on the rate constant for each product using prilled urea and granular urea, are graphically illustrated in FIGS. 5 and 6, respectively.

The rate of urea dissolution can be determined by any one of several means. The data illustrated in FIGS. 5 and 6 were obtained by suspending urea prills or granules of known diameter in the selected solution at a predetermined temperature. The solution was agitated by the minimum amount required to suspend the urea particles. The elapsed time within which the urea particles disappeared was determined by visual observation and was taken as the value of t for that combination of urea type and product solution. As discussed above, particle diameter is taken as the diameter of the largest urea particles in the feed. The largest particles in most prilled ureas have diameters of at least about 1 millimeter, usually about 2 millimeters. Granular ureas may be somewhat larger.

Knowing the value of k, the minimum reactor volume required for continuously producing any product at a given temperature can be determined from the expression for $V_o$. The same procedure can be used to determine the value of t, and thus the values of k and $V_o$ for any combination of urea type and reactant phase composition.

Figure 5:
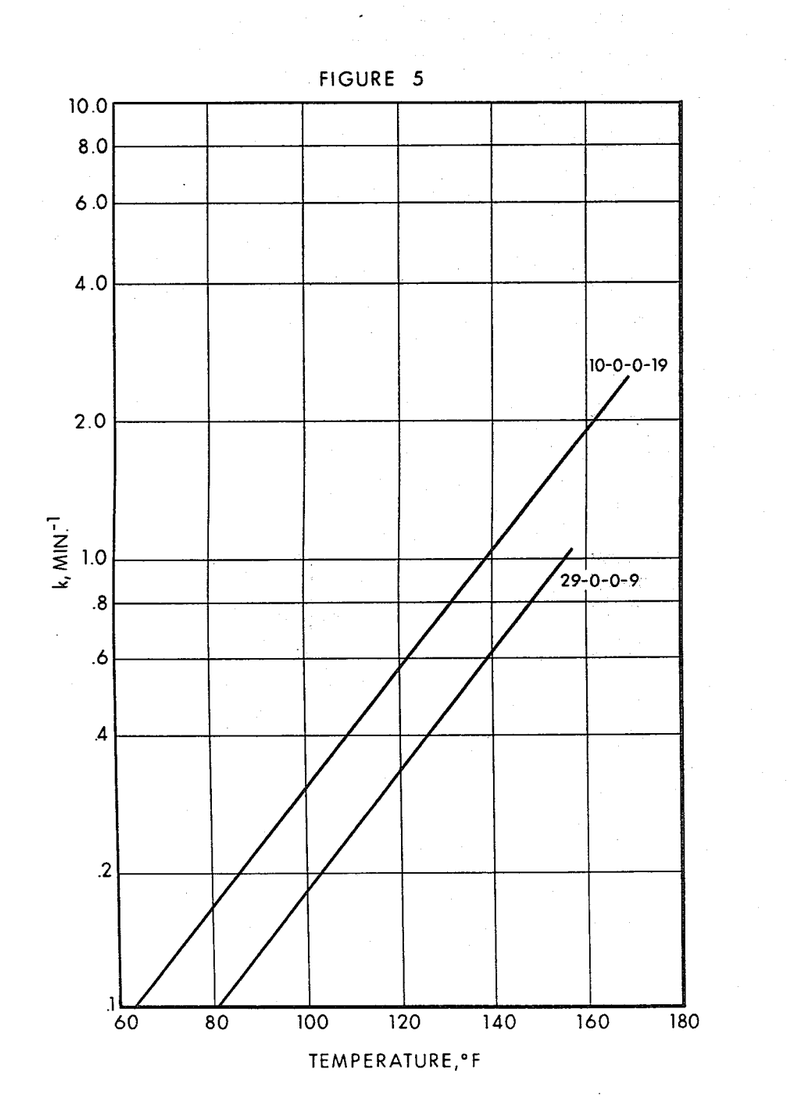
FIG. 5 is a correlation of the reaction rate constant versus temperature for the three designated products using prilled urea feed.
Figure 6:
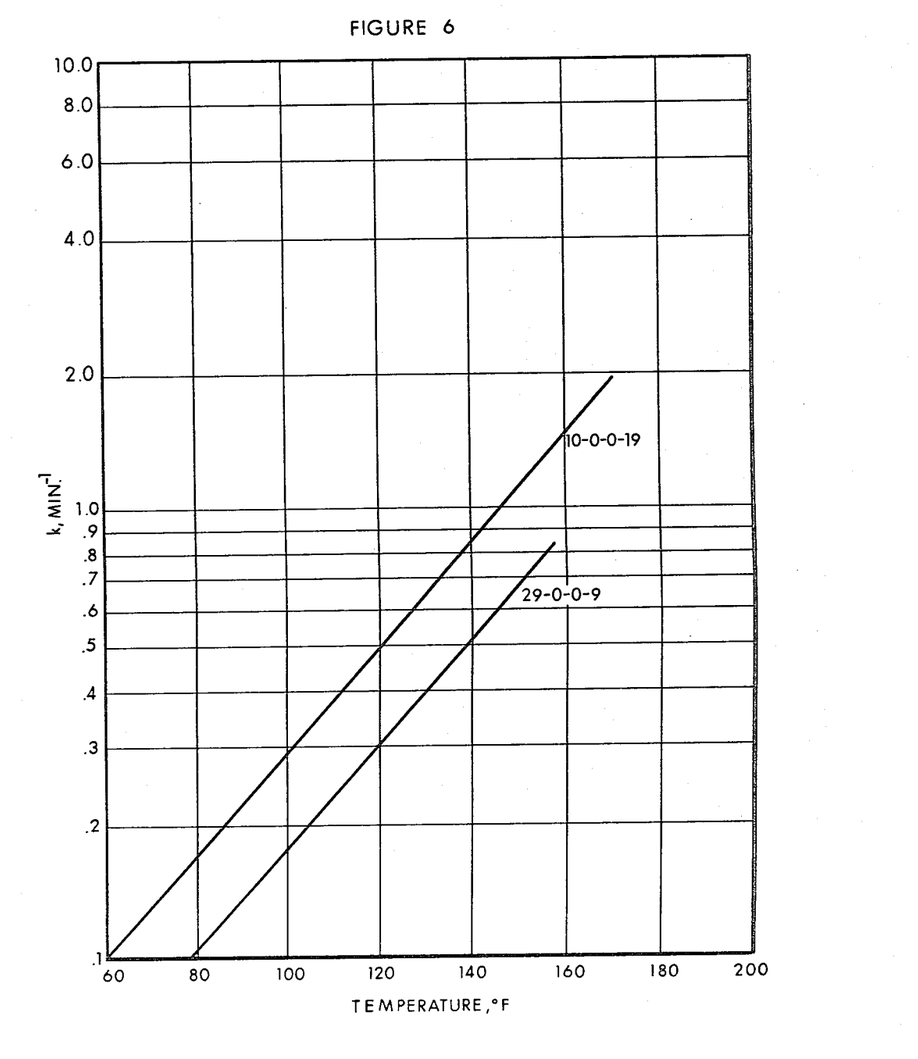
FIG. 6 is a correlation of the reaction rate constant versus temperature for the three designated products using granular urea feed.

As can be seen from FIGS. 5 and 6, the reaction rate constant diminishes markedly with temperature. Thus, from the relationship between $V_o$ and reaction constant discussed above, it can be seen that larger reactor volumes are required to obtain the same production rate of the same product at lower reaction temperatures.

Adequate control of the factors discussed above, particularly heat load, solution temperature, composition, crystallization point and corrosivity, is particularly important in industrial scale reactors of relatively large volume in which the excess heat associated with decomposition cannot be rapidly dissipated. This is especially true in the production of higher acid content compositions, e.g., those having $H_2SO_4$/urea weight ratios above 1. Most commercial systems will have reaction zone volumes of at least about 50 gallons, usually at least about 100 gallons, and most often in excess of 500 gallons. The reaction phase is relatively viscous even at reaction temperatures, and that factor, combined with the relatively low heat capacity of these compositions, makes adequate temperature control and rapid heat exchange even more difficult in the large volumes associated with commercial production.

Figure 7:
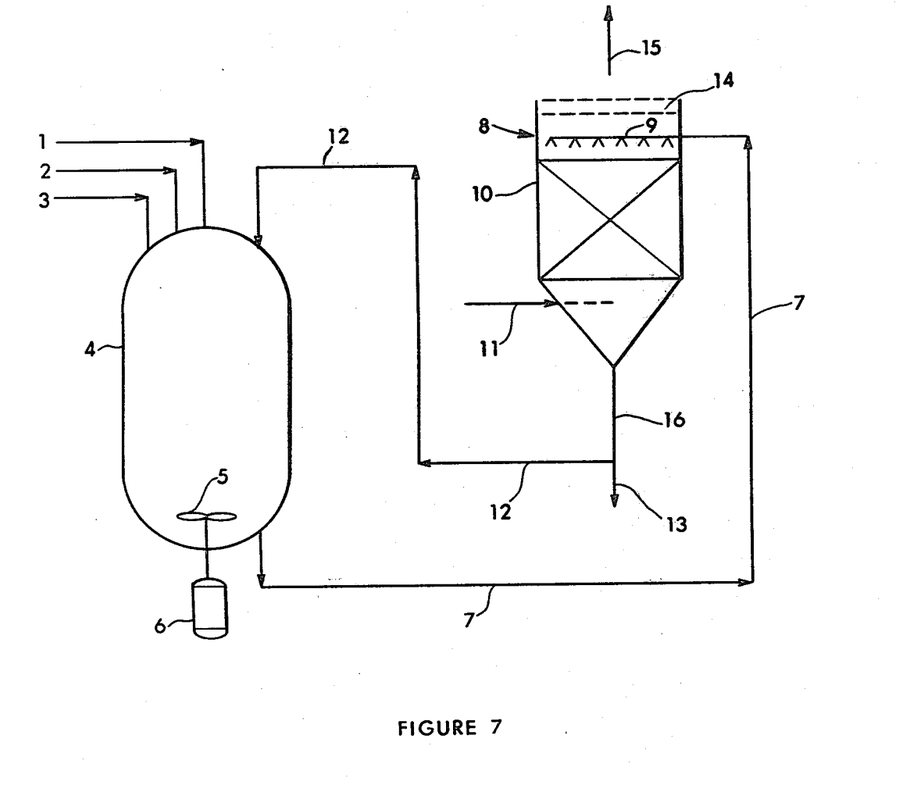
FIG. 7 is a schematic illustration of an apparatus and process system suitable for use in the manufacture of urea-sulfuric compositions encompassed by this invention.

The process can be better understood by reference to FIG. 7 which is a schematic illustration of a preferred continuous method employing countercurrent direct air heat exchange.

Solid urea, water and sulfuric acid are simultaneously and continuously added through pipes 1, 2, and 3 to reactor 4 provided with efficient agitating means, such as impeller 5 driven by motor 6 or other means. The reacting liquid phase is continuously passed from reactor 4 through pipe 7 to spray nozzles 9 in the direct air heat exchanger 8. Ambient air or cooled air is introduced to the lower portion of the heat exchanger through pipe 11 or other means, and passes upwardly through packed section 10 into direct contact with downward flowing liquid phase. Following contact with the acid, the warmed air passes through demister section 14 and can be emitted directly to the atmosphere. Even at elevated temperatures very little sulfate is present in the effluent air. Cooled product is removed from heat exchanger 8 through pipe 16 and is either passed to storage via pipe 13 or is returned as cooling medium to reactor 4 by pipe 12.

Urea can be fed in any available form, such as prills, granules, powder and the like. The minor variations in the purity of commercial ureas can be sufficient to significantly affect process conditions, even though nitrogen content usually varies only from about 46 to about 46.6 weight percent. The urea feed is preferably periodically analyzed for nitrogen content and its feed rate adjusted accordingly in view of the stoichiometry of the desired product.

The sulfuric acid feed can be concentrated sulfuric acid, usually 92 to 98 weight percent $H_2SO_4$, or it can be diluted with water before introduction into the reaction zone. Fuming sulfuric acid can also be used. Essentially any acid source is suitable. Spent alkylation acid can also be used in this process. Concentrated sulfuric acid is presently preferred due to commercial availability, and to the higher corrosivity of more dilute acid solutions.

If dilute acid feeds are employed, the amount of water added with the acid feed should not exceed the amount permitted in the product. This amount varies substantially from product to product. For instance, the minimum acid concentration that can be employed in the manufacture of 10-0-0-19 is 74.2 weight percent $H_2SO_4$ (unless water is removed from the system).

Once the continuous process is commenced, it can be run indefinitely provided that sufficient provision is made to control corrosion and that changes in product composition are not required.

In starting up either a batch or continuous process, a product inventory can be manufactured in the reaction vessel by gradual addition of the reactants in stoichiometric proportions, provided that sufficient cooling is available to maintain the reacting mixture at a temperature below the incipient decomposition temperature. In the alternative, an inventory of material produced in a previous operation can be used. In either event, the initial inventory, or heel, must be of the same composition as that of the desired product so that deviations in composition, crystallization point, heat of reaction or corrosivity do not occur during the process.

During startup, the initial inventory may be of lesser volume than that ultimately maintained in the reaction zone to assure complete reaction. The initial heel enables more adequate control of reaction temperature developed by the exothermic reaction during start-up.

The heat of reaction involved in the formation of any product can be determined calorimetrically by reacting the selected urea and sulfuric acid feeds and water, when required, under closely controlled temperature conditions sufficient to prevent incipient decomposition. The heat of reaction for a given product can then be used to calculate the total heat load on a given system, and thus the cooling capacity required for a given production rate. In the alternative, the heat of reaction can be calculated from the following expressions:

The overall reaction is illustrated by the equation:

[$(NH_2)_2CO]_x \cdot (H_2SO_4)_y$(solution).

Applying these expressions to the amount of solid urea and sulfuric acid added to the reaction zone will yield the amount of heat to be expected in the reaction. That value in turn allows the determination of production rates permissible in any system assuming the process is limited by cooling capacity, or conversely, the cooling capacity that must be provided for the production of that product at a given rate.

The high viscosity, low specific heat, low maximum allowable temperature, high corrosivity to conventional alloys at high fluid velocity in the absence of inhibitors, and low water content of these products, place severe limitations on conventional heat exchangers. Nevertheless, conventional designs such as shell and tube, coil, etc., can be used, although they must be designed in view of the product characteristics mentioned above.

The reacting liquid phase can be adequately cooled by direct contact countercurrent heat exchange with ambient air making use of a relatively simple cooling unit design such as that illustrated in FIG. 7. This approach mitigates the problems associated with the low specific heat, high viscosity and corrosivity of uninhibited urea-sulfuric acid compositions. The direct air heat exchange method adequately cools the reacting liquid phase even though it has very low vaporizable water content, and does so without introducing or removing uncontrollable amounts of water to or from the reaction phase or polluting the atmosphere.

The contact section of the cooler can consist of any corrosion and heat resistant shell, e.g., stainless steel, and an adequate quantity of acid-resistant packing of any one of numerous types. Acceptable packing materials include plastic or ceramic saddles and the like.

The design of the direct contact exchanger for any particular operation should be based upon the highest heat load anticipated which is a function of production composition and production rate, and can be established by testing different combinations of packing material, packing section design, product flow rate and air flow rate through the exchanger.

As a practical matter, the packing section should have a height to diameter ratio of at least about 1 and, for most packing materials, should be operated at liquid flow rates of about 25 to about 200 pounds per hour per cubic foot of packing and air flow rates of about 25 to about 100 cubic feet per minute per cubic foot of packing material. Significantly higher liquid flow rates should be avoided to avoid flooding the cooler while higher air flow rates should be avoided to prevent excessive resistance to downward liquid flow and product carryover into the demister section.

Continuous monitoring and compensation for water removal from the system is preferred and is necessary for precise control of composition, temperature, and corrosion. This can be achieved by monitoring product or reactor phase composition or water removal rate in the cooler and adding water as required to the reaction zone.

Even small variations in sulfuric acid feed concentration, or minor excursions in product composition, can produce sharp changes in the water removal rate in the direct air heat exchanger. This occurrence has a feedback effect on the overall process which alters reaction temperature and cooler efficiency and can result in unacceptable swings in product and reactant phase composition. This problem can be mitigated by monitoring the rate of water removal from the system and by precise control of product composition.

Product composition can be determined by periodically sampling the product effluent or reaction phase, analyzing for sulfuric acid, urea and water, and gradually modifying reactant feed rates as necessary to maintain specification product composition. Acid content can be determined by standard acid titration techniques, and both acid and urea concentrations can be determined by mass spectrographic analysis, high precision infrared or liquid chromatographic analysis, or by standard wet chemical test procedures for urea and sulfuric acid. Having determined sulfuric acid and urea concentration, water can be determined by difference. Product composition is also reflected by specific gravity and refractive index. Thus, one or both of these tests can be used in combination with total acidity to determine urea and the sulfuric acid concentration while water, again, can be determined by difference.

The thiourea compounds, either with or without the described cupric ion-containing compounds, can be added to the urea-sulfuric acid system either during or after the reaction. However, it is presently preferred that the inhibitors be added directly to the reaction zone or be combined with one of the feed components to the reaction zone when required to minimize corrosion to any carbon steel or stainless steel components to which the reaction phase and product are exposed during manufacture, storage or use.

EXAMPLE

The inhibitors listed in Table 1 were evaluated for their effectiveness in reducing the corrosion of carbon steel (AISI C-1010) by 29-0-0-9 at 130° F. under static conditions and the corrosion of stainless steel (AISI type 316) by 10-0-0-19 at 170° F. and 15 feet per second fluid velocity as indicated in the table. Sample steel coupons of known weight and surface area were suspended in a large excess of the designated compositions having the inhibitor concentrations shown in the table. Each solution was maintained at the indicated temperature throughout the test period. A 15 fps. fluid velocity was maintained in the 10-0-0-19 tests by attaching the 316 SS coupons to a rotating rod immersed in each sample solution. After 72 hours exposure, the coupons were removed from their respective solutions, cleaned and weighed to determine weight loss and corrosion rate in mils per year (MPY). The results are listed in Table 1.

TABLE 1

| Inhibitor | Concentration, ppm. | Corrosion Rate, MPY 29-0-0-9 Carbon Steel 130° F., Static | Corrosion Rate, MPY 10-0-0-19 Stainless Steel 170° F.; 15 fps. |
|---|---|---|---|
| None | | 220 | 625 |
| Ammonium Thiocyanate | 10,000 | 565 | 691 |
| Thiomalic Acid | 10,000 | 882 | 817 |
| Potassium Dichromate | 10,000 | 712 | 410 |
| Potassium Permanganate | 10,000 | 735 | 356 |
| Thiourea | 10,000 | 993 | 615 |
| 1,3-Dibutylthiourea | 10,000 | 4 | 610 |
| Diethylthiourea | 10,000 | 31 | 709 |
| Diethylthiourea | 400 | 38 | NA |
| Potassium Chlorate | 10,000 | 1200 | 950 |
| Dimethylsulfoxide | 10,000 | 291 | 575 |
| Tetramethylammonium chloride | 175 | 260 | 655 |
| Cupric Ion (As CuSO4) | 300 | 375 | <1 |
| Cupric Ion (As CUSO4) | 250 | NA | 152 |
| Sodium Sulfate | 10,000 | NA | 510 |
| Sodium Sulfide Nonylhydrate | 5,000 | 830 | 685 |
| Ammonium Nitrate | 2,000 | 1465 | 898 |
| Ammonium Phosphate (10-34-0) | 10,000 | 231 | NA |

Of all the inhibitors tested on carbon steel, only the alkylthioureas had any beneficial effect, and that effect was dramatic. The other inhibitors either had no effect or significantly increased conversion rate.

Similar results were observed in the 10-0-0-19 tests on stainless steel. Cupric ion was the only agent that significantly reduced corrosion at a practically low concentration. Dibutylthioureas had no significant effect on stainless steel corrosion and diethylthiourea slightly increased the corrosivity of 10-0-0-19 toward stainless steel. Similarly, cupric ion increased the corrosivity of 29-0-0-9 to carbon steel.

Numerous variations and modifications of the concepts of this invention will be apparent to one skilled in the art in view of the aforegoing disclosure, drawings, and the appended claims, and are intended to be encompassed within the scope of this invention as defined by the following claims.

I claim:

1. A composition of matter comprising about 5 to about 75 weight percent urea, about 5 to about 85 weight percent sulfuric acid, and about 0 to about 75 weight percent water in which (i) the urea/sulfuric acid molar ratio is greater than 2 or less than 1, (ii) said urea and sulfuric acid, in combination, constitute at least about 25 weight percent of said composition, and (iii) a portion of said urea and sulfuric acid are present as a member selected from the group consisting of monourea sulfate, diurea sulfate, and combinations thereof, containing a corrosion inhibiting amount of a dialkylthiourea in which each alkyl group has from one to about four carbon atoms, sufficient to reduce the corrosivity of said composition to carbon steel.

2. The composition defined in claim 1 containing less than about 50 weight percent water, wherein said sulfuric acid and said urea, in combination, constitute at least about 50 weight percent of said composition.

3. The composition defined in claim 1 containing less than about 25 weight percent water, wherein said sulfuric acid and said urea, in combination, constitute at least about 75 weight percent of said composition.

4. The composition defined in claim 3 containing at least about 25 ppm of said dialkylthiourea.

5. The composition defined in claim 1 comprising at least about 25 ppm of said dialkylthiourea wherein said urea/sulfuric acid molar ratio is greater than 2.

6. A composition of matter relatively noncorrosive to carbon steel comprising a liquid urea-sulfuric acid reaction product containing about 10 to about 70 weight percent urea, about 10 to about 80 weight percent sulfuric acid, and about 0 to about 25 weight percent water, in which (i) the urea/sulfuric acid molar ratio is greater than 2 or less than 1, (ii) said urea and sulfuric acid, in combination, constitute at least about 75 weight percent of said composition, and (iii) a portion of said urea and said sulfuric acid are present as a member selected from the group consisting of monourea sulfate and diurea sulfate, and combinations thereof, containing at least about 50 ppm of a dialkylthiourea in which each alkyl group has from 1 to about 4 carbon atoms, sufficient to reduce the corrosivity of said composition to carbon steel.

* * * * *